Oct. 7, 1941.　　　C. V. SWEARINGEN　　　2,257,865
CHLORINATOR
Filed Nov. 24, 1939　　　2 Sheets-Sheet 1

C. V. Swearingen
INVENTOR.
BY *C. A. Snow & Co.*
ATTORNEYS.

Oct. 7, 1941.            C. V. SWEARINGEN            2,257,865
CHLORINATOR
Filed Nov. 24, 1939                    2 Sheets-Sheet 2
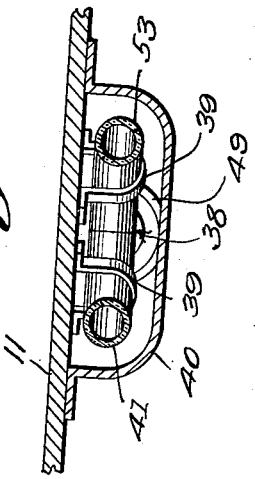
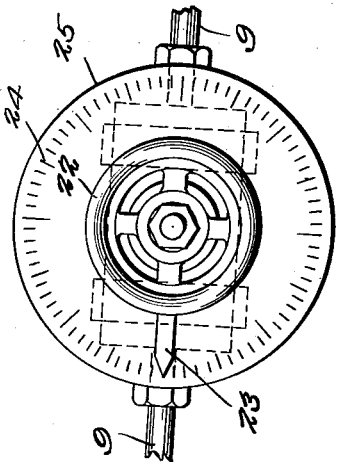
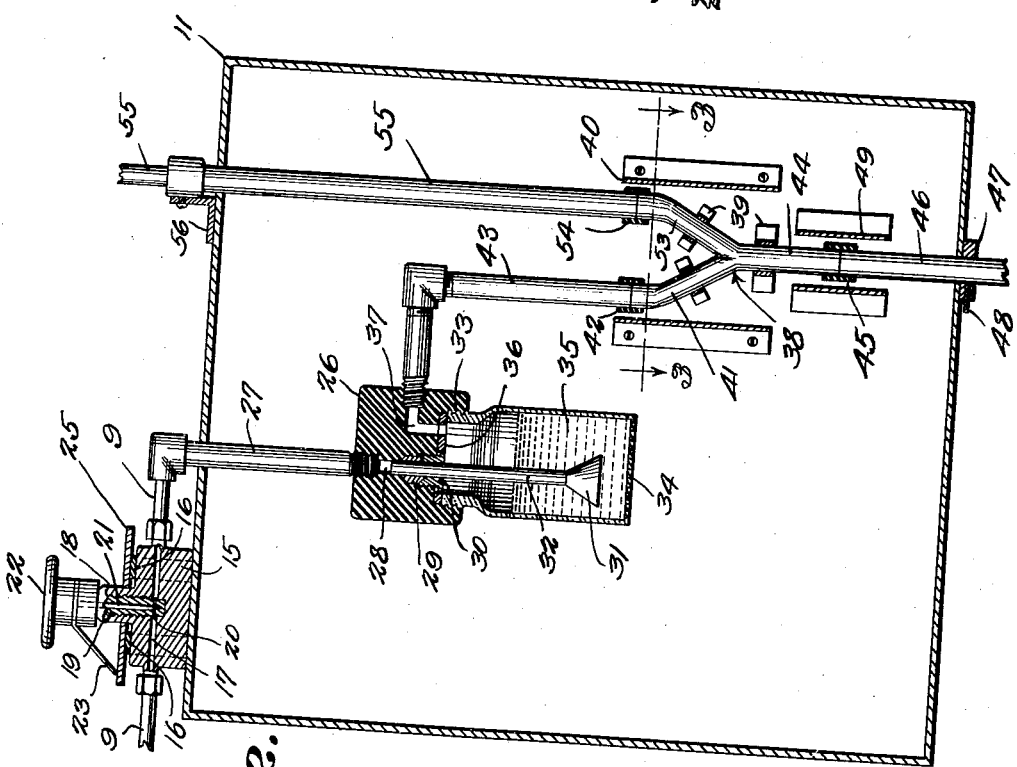
C. V. Swearingen
INVENTOR.
BY
ATTORNEYS.

Patented Oct. 7, 1941

2,257,865

UNITED STATES PATENT OFFICE 2,257,865

CHLORINATOR

Clair Vere Swearingen, Chattanooga, Tenn.

Application November 24, 1939, Serial No. 306,022

2 Claims. (Cl. 210—28)

This invention aims to provide novel means whereby water may be chlorinated, either where there is a supply of flowing water, or a supply of water standing at rest, novel means being provided whereby a proper mixture of chlorine and water may be attained. Another object of the invention is to supply novel means whereby the passage of the chlorine gas may be ascertained by inspection, to enable the operator to make the required adjustment as to the supply of chlorine which is going forward.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a vertical sectional view of the cabinet and associated parts;

Fig. 3 is a section on the line 3—3 of Fig. 2;

Fig. 4 is a top plan of the mechanism whereby the flow of chlorine gas is regulated at the will of an operator;

Figures 1, 5:
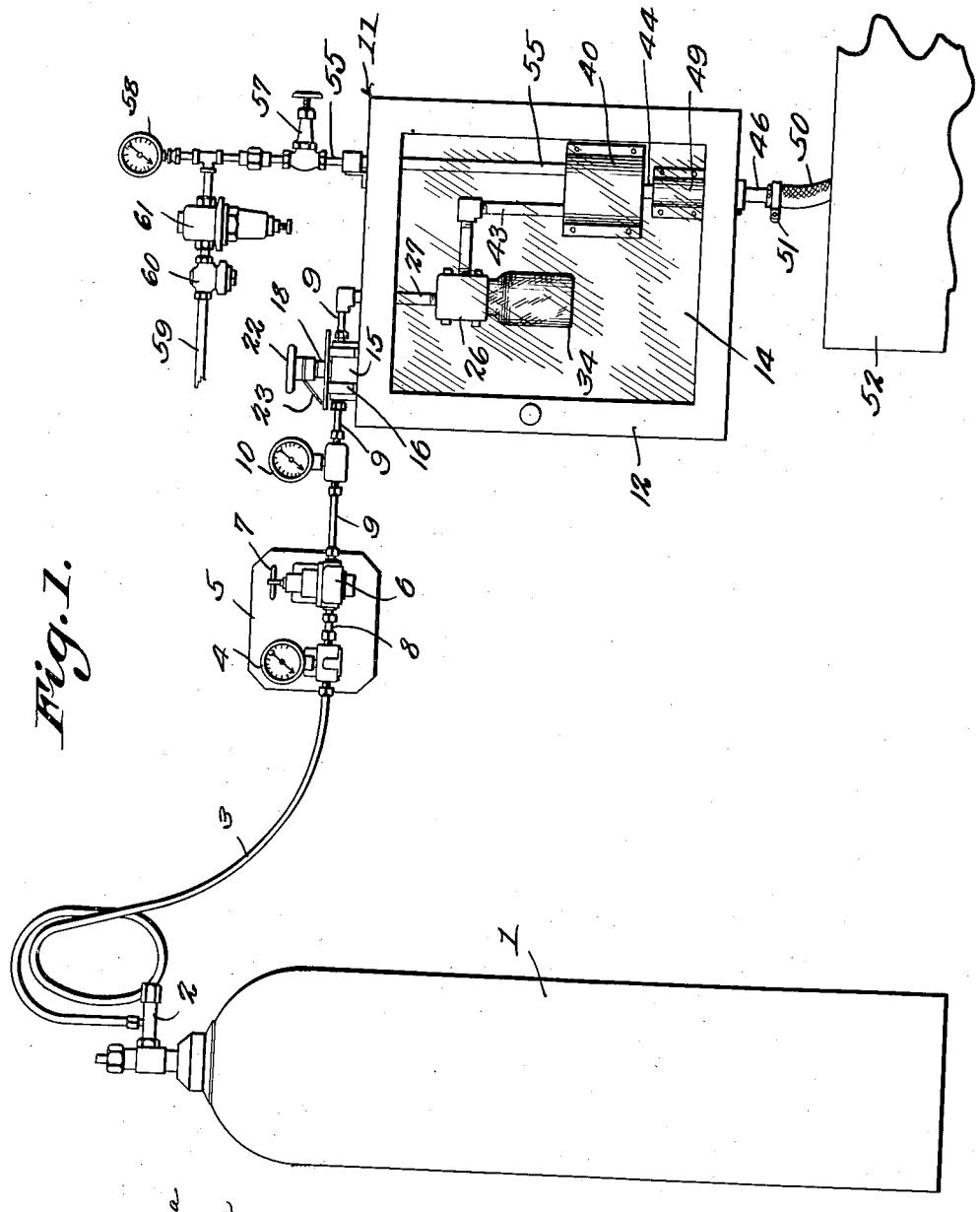
Fig. 1 shows, in elevation, a device constructed in accordance with the invention.
Fig. 5 is a fragmental sectional view showing a modification.

The numeral 1 marks a tank, adapted to contain liquid chlorine, sometimes under a pressure of about one hundred and fifty pounds. At its upper end, the tank 1 is supplied with a lateral valve 2, under the control of an operator, and to the valve 2 is connected a flexible tube 3, of any desired length.

The flexible tube 3 leads to a gauge 4, indicating pressure in the tank 1, the gauge being mounted, if desired, on a panel 5, carrying a pressure regulator 6, adapted to be adjusted by means under the control of an operator and indicated at 7. The connection between the pressure gauge 4 and the pressure regulator 6 is marked by the numeral 7. Piping 9 leads from the pressure regulator 6. The numeral 10 designates a gauge for indicating the pressure of the chlorine gas, the gauge 10 being interposed in the piping 9.

At any suitable place there is located a cabinet 11, provided with a hingedly mounted door 12, carrying a glass panel 14. A valve body 15 is held by straps 16 on the upper end of the cabinet 11, and the valve body has a passage 17, in communication with the piping indicated at 9.

The valve body 15 is supplied with an upstanding neck 18, into which is threaded a bushing 19, extended downwardly into the valve body 15, across the passage 17.

The bushing 19 has a transverse passage 20, communicating with the passage 17 of the valve body 15. The passage 20 in the bushing 19 is controlled by a needle valve 21, threaded into the neck 18 of the valve body 15 and operated by a hand wheel 22, carrying an index arm 23, adapted to cooperate with a scale 24 on a dial 25, the dial being mounted on the neck 18, immediately above the straps 16, the index arm 23 being downwardly inclined, so that it may work close to the dial 25.

A block or body 26, preferably made of hard rubber, is secured in the cabinet 11. A depending nipple 27 is secured to the end of the piping 9 and leads downwardly into the cabinet 11, the lower end of the nipple being threaded into the block 26, at the upper end of a vertical bore 28 in the block. A packing 29 is mounted in the block 26 at the lower end of the bore 28, and is held compressed by a tubular nut 30, threaded into the block. The numeral 31 marks a funnel, preferably made of glass, and including an elongated, upwardly extended neck 32, communicating with the bore 28, the compressed packing 29 making a tight joint about the neck of the funnel. In its lower end, the block 26 is supplied with a recess 33, into which is removably threaded a receptacle 34, preferably a glass jar, adapted to contain a quantity of liquid 35, such as water, a compressible gasket 36 being interposed between the upper end of the receptacle 34, and the block 26, at the upper end of the recess 33. The block 26 is provided with a rectangular bore 37, opening laterally through the block, and downwardly into the receptacle 34. The funnel 31 is disposed in the receptacle 34, near the bottom of the receptacle, and in the liquid indicated at 35.

A Y 38 is disposed in the cabinet 11, and, preferably, is made of glass, the Y being held in place by clips or retainers 39 carried by the cabinet. The Y is enclosed within an arched guard 40, having outstanding flanges secured to the cabinet 11. One branch 41 of the Y 38 is connected by a resilient coupling 42 to the lower end of an angular pipe 43, the upper end of which is connected to the block 26, by threading or otherwise, in communication with the angular bore 37 of the block 26.

A depending shank 44 of the Y 38 is connected by a resilient coupling 45 to a depending pipe 46, held in a collar 47 on the bottom of the cabinet 11, the collar carrying a set screw 48, engaging the pipe. The coupling 45, and part of the stem of the Y 38, are covered by a guard 49, resembling the guard 40, and mounted on the cabinet 11. A flexible tube 50 is secured at 51 to the lower end of the part 46 and communicates with a container or tank 52, in which the water is chlorinated.

The Y 38 includes a branch 53 connected by a resilient coupling 54 to a water supply pipe 55, the coupling 54 being located within the guard 40. The water supply pipe 55 leads upwardly through the top of the cabinet 11, and is secured thereto by an angle bracket 56 or otherwise.

In Fig. 5, parts hereinbefore described have been designated by numerals already used, with the suffix "a". This figure indicates that the branch 53 may be omitted, if desired, if there is no water supply represented by the water pipe 55. Under such circumstances, the container 52 of Fig. 1 may be considered as the source of water supply, and may be a spring, pond or the like.

Reverting to the form in which the water supply pipe 55 is used, it will be noted in the drawings that the pipe 55 extends upwardly out of the casing 11, a cut-off valve 57 being interposed in the pipe, closely adjacent to the cabinet 11 if desired. The pipe 55 is surmounted by a gauge 58, indicating the water pressure. The pipe 55 is shown as supplied with a lateral arm 59, in which is interposed a strainer 60, a pressure reducing valve 61 being interposed in the arm 59, between the strainer and the hand valve 57.

The functions of the parts beginning with the chlorine liquid tank 1 and ending with the pipe 9, will be understood readily without an extended description. Let it suffice to say that through the instrumentality of them, a supply of chlorine gas, under reduced and governed pressure, is delivered to the nipple 27 of Fig. 2. Moreover, the functions of the parts beginning with the water main 59 in Fig. 1, and ending with the valve 57, will be manifest when the drawings are noted, in connection with the foregoing description. The ultimate result attained is that a supply of water, under governed and regulated pressure, moves downwardly through the pipe 55.

The chlorine gas moves downwardly through the nipple 27, and through the neck 32 of the funnel 31, into the water 35 in the receptacle 34. Since the receptacle 34 is transparent, and since the door 12 of the cabinet 11 embodies the transparent panel 14, an operator can note by inspection, how rapidly the bubbles of chlorine gas pass out of the funnel 31, and upwardly through the liquid 35, the flow of chlorine gas being regulated, as occasion may demand, by a proper manipulation of the hand wheel 22, the position of the index arm 23 on the scale 24 of the dial 25 being noted.

From the receptacle 34, the chlorine gas passes upwardly through the bore 37 in the block 26, and downwardly through the pipe 43 and the branch 41 of the Y 38. At the place of juncture between the arms 41 and 53 of the Y 38, the chlorine gas is mingled with the water, the water flowing downwardly through the shank 44 of the Y 38, and through the pipe 46, through the tube 50, and into the container 52. If there is no source of supply such as indicated by the pipe 55, the construction of Fig. 5 is used, the chlorine gas passing down through the branch 41a and the shank 44a, into container 52, which then represents the source of water supply to be chlorinated.

It will be observed that when the guard 40 and the guard 49 are removed, the couplings 45, 42 and 54 may be detached, setting the Y 38 free for removal, renewal or cleaning.

The structure shown in Fig. 2 of the drawings is simple in construction, but it furnishes an effective means for carrying out the ends in view.

Having thus described the invention, what is claimed is:

1. In a water chlorinator, a fragile and non-metallic Y including a depending shank and first and second branches, an outlet member for chlorinated water, a resilient slip-sleeve coupling connecting the outlet member to the shank, a source of water supply, a resilient slip-sleeve coupling connecting the first branch to the source of water supply, a chlorine conduit, a resilient slip-sleeve coupling connecting the second branch to the chlorine conduit, the chlorine conduit comprising a transparent, inspection portion, removable guard means housing the Y and the couplings, and means for supplying chlorine to the chlorine conduit.

2. In a water chlorinator, a support, a block secured to the support and having intake and delivery bores, the block being supplied in its lower end with a recess, a chlorine outlet member having one end mounted in the outer end of the delivery bore, a chlorine intake member having one end mounted in the outer end of the intake bore, a chlorine discharge member extended into the inner end of the intake bore, a packing in the intake bore, about the discharge member, a nut threaded into the inner end of the intake bore and compressing the packing about the discharge member, a transparent receptacle threaded into the recess, a gasket in the recess and forming a tight connection between the upper end of the receptacle and the block, the delivery member extending through the gasket and into the receptacle, and the delivery bore communicating with the receptacle, through the gasket, means to supply chlorine to the intake member, and means to conduct the chlorine to the point of use.

CLAIR VERE SWEARINGEN.